(12) United States Patent
Korger

(10) Patent No.: US 6,880,050 B1
(45) Date of Patent: Apr. 12, 2005

(54) STORAGE DEVICE, SYSTEM AND METHOD WHICH CAN USE TAG BITS TO SYNCHRONIZE QUEUING BETWEEN TWO CLOCK DOMAINS, AND DETECT VALID ENTRIES WITHIN THE STORAGE DEVICE

(75) Inventor: Peter Korger, Frederick, CO (US)

(73) Assignee: LSI Logic Corporation, Milpitas, CA (US)

( * ) Notice: Subject to any disclaimer, the term of this patent is extended or adjusted under 35 U.S.C. 154(b) by 579 days.

(21) Appl. No.: 09/702,202

(22) Filed: Oct. 30, 2000

(51) Int. Cl.[7] .............................................. G06F 12/00
(52) U.S. Cl. ...................................... 711/156; 710/55
(58) Field of Search ................................ 711/147, 149, 711/156, 154; 710/52, 55, 57, 58; 365/189.01; 345/558

(56) References Cited

U.S. PATENT DOCUMENTS

| | | | | | |
|---|---|---|---|---|---|
| 5,732,286 | A | * | 3/1998 | Leger ........................... | 710/57 |
| 5,748,947 | A | * | 5/1998 | Fukushima ................. | 345/501 |
| 5,768,546 | A | * | 6/1998 | Kwon ........................ | 710/307 |
| 5,884,099 | A | * | 3/1999 | Klingelhofer ................ | 710/52 |
| 6,408,409 | B1 | * | 6/2002 | Williams et al. ............ | 714/719 |
| 6,433,787 | B1 | * | 8/2002 | Murphy ....................... | 345/556 |
| 6,563,505 | B1 | * | 5/2003 | Mills et al. ................. | 345/522 |
| 6,574,689 | B1 | * | 6/2003 | Zaidi et al. .................... | 710/52 |

FOREIGN PATENT DOCUMENTS

JP          10-112178    *  4/1998    ............ G11C/7/00

* cited by examiner

*Primary Examiner*—Matthew Anderson
*Assistant Examiner*—Shane Thomas
(74) *Attorney, Agent, or Firm*—Daffer McDaniel LLP

(57) ABSTRACT

A system and method are presented for indicating active tag bits within valid entries of a dual-clock FIFO data buffer, used to transfer data between two clock domains. Data (containing tag bits) are written to the FIFO and read from the FIFO using separate clocks. Data writes are synchronous with the first clock, while reads are synchronous with the second clock. A FIFO entry is "valid" after data has been written to it, and before it is read. The system disclosed herein identifies the valid FIFO entries and generates a set of logic outputs, synchronized to the second clock (i.e., the read clock). Each output corresponds to one of the tag bit positions, and is HIGH if the corresponding tag bit is HIGH in any of the valid entries. This creates a means of detecting active tag bits in the FIFO without having to actually read each entry. Since the tag bits convey important information about the source and nature of the data, this detection system may expedite the data transfer. A simple implementation of the method is described, based primarily on conventional combinatorial logic. The method is straightforward and can readily be incorporated into an integrated circuit.

16 Claims, 3 Drawing Sheets

STORAGE DEVICE, SYSTEM AND METHOD WHICH CAN USE TAG BITS TO SYNCHRONIZE QUEUING BETWEEN TWO CLOCK DOMAINS, AND DETECT VALID ENTRIES WITHIN THE STORAGE DEVICE

BACKGROUND OF THE INVENTION

1. Field of Invention

This invention relates to FIFO queues and, more particularly, to synchronization of FIFO data transfers between two clock domains.

2. Description of Related Art

In digital electronic systems, a clock of some sort is usually present to provide a timing reference for dynamic processes. In such systems, the output of the clock is generally a periodic waveform, alternating between two voltage levels. Discrete states within the system are associated with clock transitions. Thus, a synchronous logic device may change from one state to another only on a rising or falling edge of the clock. The transfer of digital data is also frequently governed by a clock. For example, a peripheral device in a personal computer may exchange data with the main processor using a high-speed bus, such as the PCI bus, in which a clock is employed to synchronize read/write operations.

It is sometimes necessary to transfer data between two systems having different clocks. One means of accomplishing this is to use a first-in first-out (FIFO) buffer. Data are typically received at the FIFO input and propagate through the FIFO at each clock transition, eventually reaching the output. The FIFO derives its name from the fact that the data emerge from the FIFO in the same order in which they enter (therefore, a FIFO is a type of queue). A FIFO may employ different clocks for reading and writing data. This can be very useful for "burst mode" data transfers. For example, suppose it is necessary to record a transient event using a high-speed digital video camera, and then transfer the data to a computer. This presents a problem, since the camera may collect samples at a rate much higher than the computer can receive them. A dual-clock FIFO may be used to buffer the data however. The samples can be entered into the FIFO by the camera's sample clock, and subsequently read out by the slower computer clock. As long as the FIFO is fast enough to keep up with the camera and deep enough to hold all the samples, there is no data loss.

It is often advantageous to include tag bits along with the data in the FIFO entries. These tag bits may be used as flags to denote the type of transaction for which the data is intended. For example, individual bits can be used to distinguish a read or write operation, or to indicate the source of the data. Tagging can facilitate data transfer, since less processing is required at the receiving end to ascertain the nature of the transfer. Note that the width of each FIFO entry (i.e., number of bits) must include the tab bits as well as the data. For example, each FIFO entry might be 10 bits wide, to accommodate 8 bit data words with 2 tag bits.

In some situations, data are continuously written to and read from a dual clock FIFO. It is essential in such cases to known which locations in the FIFO contain valid data. When power is first applied, the FIFO is filled with random data—so every entry is invalid. Thereafter, a valid entry is created each time a new value is clocked into the FIFO; the entry becomes invalid when its contents are clocked out. Typically, read and write pointers store the location of the oldest and most recent valid entries in the FIFO.

To reduce latency in a dual clock FIFO system, it is desirable to be able to determine the status of the tag bits belonging to valid FIFO entries prior to actually reading the entries. This requires a means for selectively testing tag bits in the valid entries, while ignoring the invalid entries. The circuitry to perform this function must be relatively simple (so it can be readily implemented in an integrated circuit) and capable of high-speed operation (so its use does not compromise FIFO throughput). A further requirement is that the circuitry operates across two different clock domains.

SUMMARY OF THE INVENTION

Dual-clocked first-in first-out (FIFO) buffers are often used to resynchronize data transferred across clock domains. Frequently, a tag bit field is attached to the data during the transfer. The tag bits serve as flags to indicate, for example, the source or destination of the associated data. However, it is usually necessary to read a given entry from the FIFO before the tag bits can be evaluated. Arbitration of the tab bits contributes to overhead in the data transfer, and it would be advantageous to be able to perform a "look ahead" evaluation of the tag bit fields, prior to actually reading the entries out of the FIFO.

This capability is provided by the system and method disclosed herein for detecting active tag bits in any of the valid FIFO entries. Advantageously, the new method operates "across clock domains". This refers to the fact that separate clocks, possibly operating at different clock rates, are used for writing and reading the FIFO data. Such may be the case, for example, when data are being transferred from one circuit or system to another. The method also has the advantage that it is based on simple, combinatorial logic. Therefore, it is straightforward to implement and suitable for high-speed operation.

In an embodiment of the system discussed herein, the FIFO buffer consists of N entries, with each entry comprising a D-bit data field and a B-bit tag bit field. A write clock synchronizes entry of data into the FIFO, and a separate read clock synchronizes reading of the data by the receiving circuitry. A pair of N-bit registers is also present; one corresponds to FIFO writes and the other to reads. Each bit in these registers is associated with a FIFO entry, and toggles when the FIFO write/read pointer points to its respective entry. A set of N XOR gates, one for each entry, compares the state of corresponding bits in the two registers. The bits differ when the write pointer advances ahead of the read pointer—i.e., when data has been written to a given entry, but not yet read. Thus, each of the N XOR gates indicates whether its corresponding FIFO entry is valid.

For each entry, a T-bit bus brings out the tag bit logic levels. Each bus signal is received as an input to one of a set of T AND gates. The other input of each AND gate is driven by the associated XOR gate, and is HIGH only if the corresponding FIFO entry is valid. Thus, the AND gates transmit only the tab bits belonging to valid FIFO entries.

An OR gate is associated with each of the T tag bits, and indicates the active status of its respective tag bit in any of the valid entries. The $i^{th}$ OR gate combines the outputs from the $i^{th}$ AND gate in each of the N sets of AND gates. Thus, if the $i^{th}$ tag bit is active in any valid entry, the associated AND gate output will be HIGH, causing the $i^{th}$ OR gate to go HIGH. Each OR gate output is clocked into a flip-flop, to synchronize it with the read clock.

A method for detecting active tag bits in any of the valid entries of a FIFO is also contemplated herein. The method consists of detecting which entries in the FIFO are valid and detecting the active tag bits in those entries, then logically ORing the active state of each tag bit over all the valid entries. This gives rise to a set of T logic signals, representing the active state of the T tag bits throughout the valid entries of the FIFO.

BRIEF DESCRIPTION OF THE DRAWINGS

Other objects and advantages of the invention will become apparent upon reading the following detailed description and upon reference to the accompanying drawings in which.

Figure 1A:
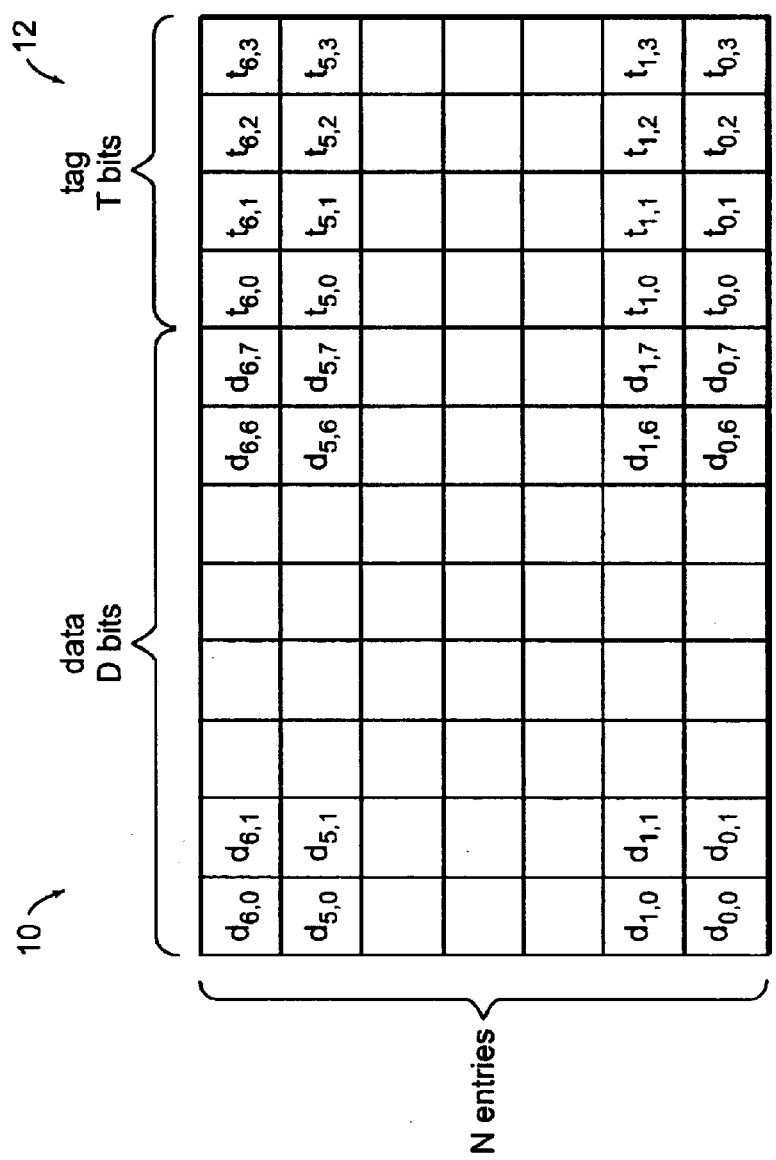
FIGS. 1a and 1b illustrate the organization of a storage device, such as a first-in first-out (FIFO) buffer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Data may be transferred between two clock domains through the use of a dual-clock first-in first-out (FIFO) buffer. Data may be written to the FIFO queue in the first clock domain and read out in the second. Often, these domains are mutually asynchronous—i.e., the timing for the read and write operations is based on independent clock rates. The ability of the dual-clock FIFO to effectively resynchronize the data from one clock domain to another makes it useful for high-speed data transfer between mutually asynchronous systems (e.g., from a peripheral device to a computer).

This ability is augmented by the combination of tag bits with the data being transferred. Tag bits serve as flags to the receiving circuitry, and can improve data transfer efficiency. They indicate to the receiving circuitry the nature (e.g., read, write) or source (e.g., I/O device, memory) of the data transaction. In doing so, tag bits simplify management of the data flowing into and out of the FIFO. This advantageously allows the receiving circuitry to be simplified, and contributes to higher maximum data throughput.

A FIFO, as considered herein and shown in FIG. 1a, may be organized as N entries, wherein the entries are comprised of D bits of data 10 and T tag bits 12. (In the example of FIG. 1a, D=8, T=4, and N=7.) Each entry is represented as a row in FIG. 1a. For example, the $6^{th}$ entry comprises data bits $d_{5,0}$ through $d_{5,7}$, and tag bits $t_{5,0}$ through $t_{5,3}$. The FIFO entries are accessed using read and write pointers. When the FIFO is initialized, these pointers are typically set to the first entry (i.e., the row comprising $d_{0,0}$ through $t_{0,3}$ in FIG. 1a). Note, however, that the FIFO is addressed as a circular queue, in which both the read and write pointers "wrap around" when incremented beyond the $N^{th}$ entry. Consequently, the initial setting of these pointers is really arbitrary, so long as they agree with one another. As each new entry is written to the FIFO, the write pointer is incremented. Similarly, the read pointer is incremented each time an entry is read from the FIFO. Typically, the number of entries currently in the FIFO is computed as the difference between the write and read pointers:

entries=mod(write_ptr—read_ptr, N)

This value may be used by internal logic to inhibit writing to the FIFO when it is full, or reading when it is empty.

Figure 1B:
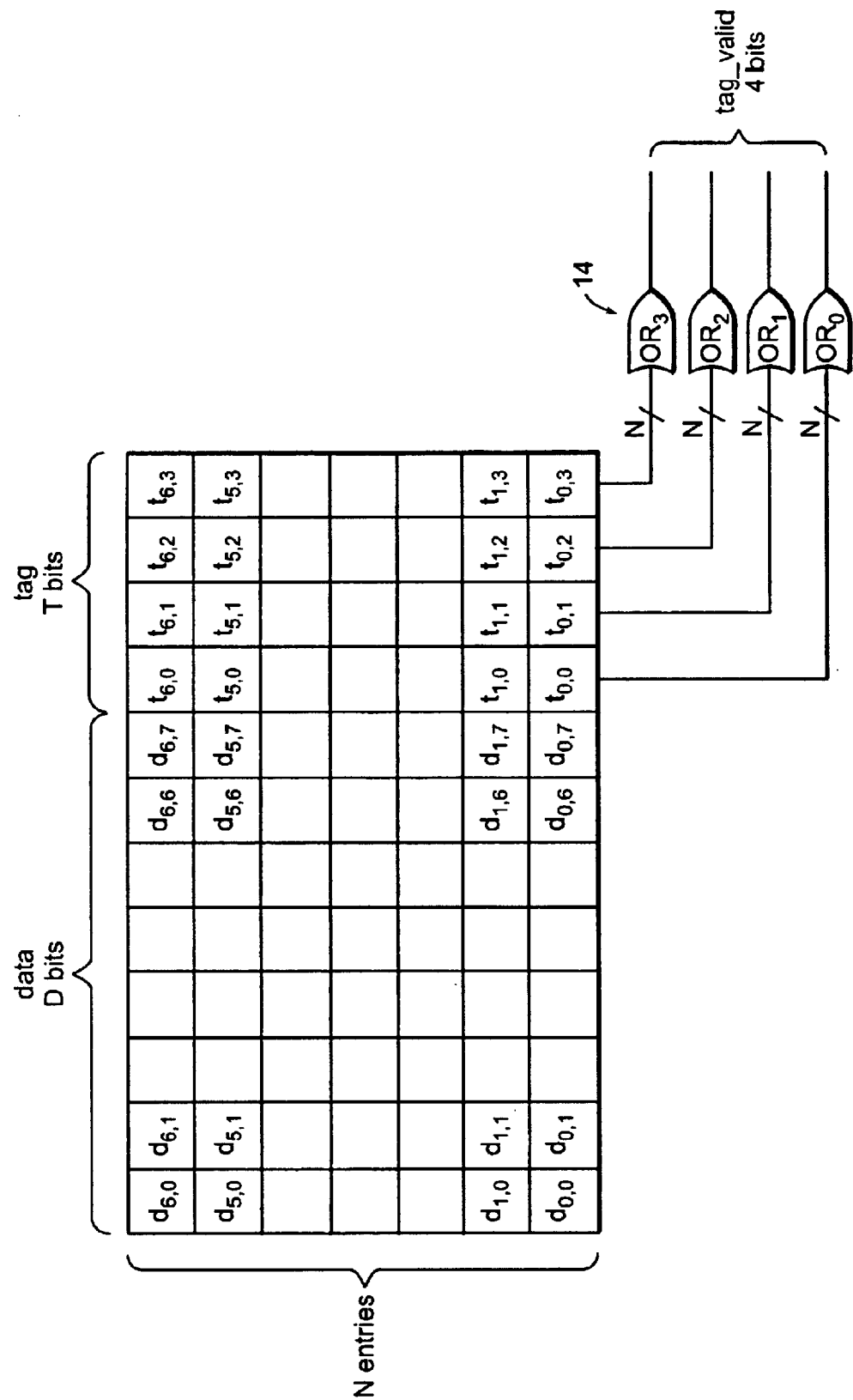

If all of the entries in the FIFO of FIG. 1a contained valid data, it would be possible to test the tag bit fields simultaneously, using logic such as shown in FIG. 1b. Each of the OR gates 14 shown in FIG. 1b receive N signals representing the state of the corresponding bits in the N entries of the FIFO. For example, the gate $OR_3$ receives the logic levels of tag bits $t_{0,3}, t_{1,3}, \ldots, t_{5,3}, t_{6,3}$. Therefore, the output of $OR_3$ is HIGH if any of these tag bits is set. As an example of how this may be useful, assume that tag bit $t_{i,3}$ serves as a flag to denote that the $i^{th}$ FIFO entry contains data from a particular I/O device. By testing the output of gate $OR_3$, it is possible to determine whether the FIFO contained data from that I/O device without having to read all of the entries. The receiving circuitry may employ this information, for example, to store the data into a special buffer dedicated to that I/O device.

Of course, it is not generally the case that all of the FIFO entries are valid. Some additional logic is therefore needed to avoid ORing the tag bits from invalid entries. Moreover, the circuitry that validates the tag bits must account for the different clock domains on the read and write sides of the FIFO. This is accomplished by the system described herein, an embodiment of which is shown in FIG. 2.

Figure 2:
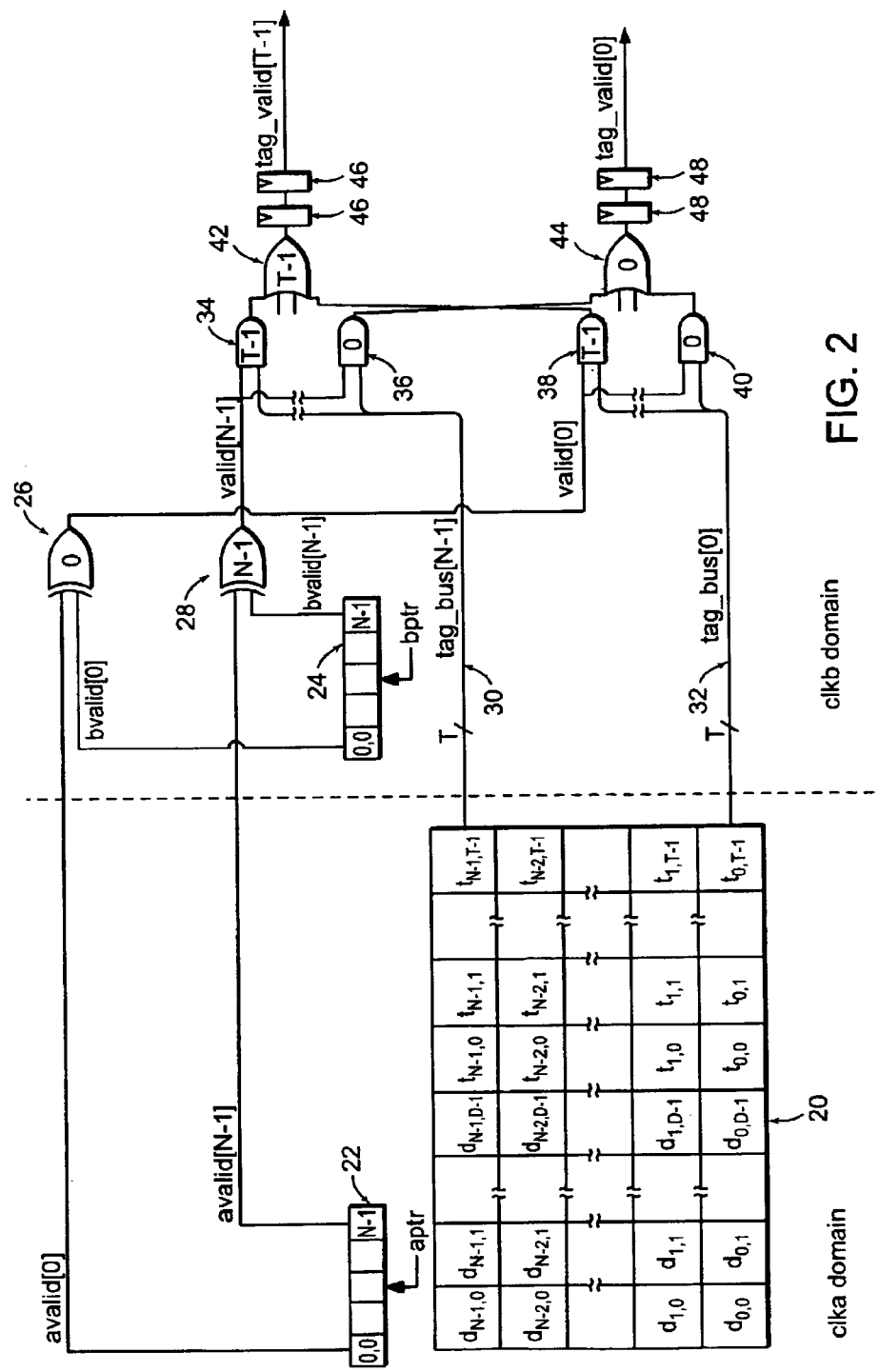
FIG. 2 illustrates an embodiment of the device, system and method disclosed herein for indicating the presence of active tag bits in the valid entries of a dual-clocked FIFO buffer.

The boundary between the two clock domains is represented by the heavy dashed line in FIG. 2. Data are entered into the FIFO 20 using clka and read out using clkb. The FIFO has N entries, with the $i^{th}$ entry comprising D data bits $(d_{i,0}, \ldots, d_{i,D-1})$ and T tag bits $(t_{i,0}, \ldots, t_{i,T-1})$. The FIFO's write pointer, aptr, is associated with clock clka, and its read pointer, bptr, with clock clkb. Two registers, avalid 22 and bvalid 24, are associated with the write and read pointers, respectively. These registers are comprised of N flip-flops, and are both initialized to the same values. When a new $i^{th}$ entry is written to the FIFO, aptr is incremented from i to i+1, to indicate the location of the next available entry in the FIFO, and the $i^{th}$ flip-flop in register avalid 22 is toggled. A counterpart in the clkb domain, bvalid 24, operates similarly for FIFO read operations. When the $i^{th}$ entry is read out of the FIFO, bptr is incremented from i to i+1, and the $i^{th}$ flip-flop in register bvalid 24 is toggled. A set of N XOR gates compares the state of each flip-flop in avalid with the corresponding flip-flop in bvalid. Referring to FIG. 2, XOR gate 26, compares avalid[0] and bvalid[0], while XOR gate 28 compares avalid[N-1] with bvalid[N-1]. (For simplicity, the other N-2 XOR gates are not shown.) The output of each XOR gate is HIGH only if its inputs differ. Initially, avalid and bvalid are set to the same value. Therefore, every element of avalid matches the corresponding element in bvalid, and the outputs of all of the XOR gates are LOW. When a new value is written into the $i^{th}$ entry of the FIFO, avalid[i] toggles, causing it to assume the opposite logic level to that of bvalid[i]. This causes the $i^{th}$ XOR gate to go HIGH. This condition persists until the $i^{th}$ entry is read out of the FIFO, causing bptr to toggle bvalid[i]. Thus, each of the N XOR gates generates a signal indicating whether the corresponding entry in the FIFO is valid (i.e., has been written to, but not yet read). For example, the output of XOR gate 26 (valid[0]) is HIGH only if the $0^{th}$ entry is valid, and the output of XOR gate 28 (valid[N-1]) is HIGH only if the $N-1^{th}$ entry is valid.

A bus is associated with each of the N FIFO entries. Each bus has T bits, and is derived from the tag bits of its respective entry. For example, tag_bus[N-1] 30 is comprised of signals representing the state of the tag bits in the N-1$^{th}$ entry, $t_{N-1,0}, t_{N-1,1}, \ldots, t_{N-1,T-1}$. Similarly, tag_bus[0] 32 is comprised of signals representing the state of the tag bits in the 0$^{th}$ entry, $t_{0,0}, t_{0,1}, \ldots, t_{0,T-1}$. (For simplicity, the other N-2 buses are not shown.) A set of T AND gates, each with 2 inputs, is also associated with each of the N FIFO entries. Each gate in the set receives one of the T signals in the corresponding tag bit bus, along with a qualifying signal from the XOR gate associated with that entry. For example, tag_bus[N-1] 30 contains T signals representing the state of the tag bits in the N-1$^{th}$ FIFO entry. AND gate 34 receives the state of tag bit $t_{n-1,t-1}$, while AND gate 36 receives the state of tag bit $t_{n-1,0}$. (For simplicity, the other T-2 AND gates are not shown.) The AND gates also receive the output (valid[N-1]) of XOR gate 28. If the N-1$^{th}$ entry is valid, XOR gate 28 drives valid[N-1] HIGH, enabling AND gates 34 and 36 (along with the other T-2 AND gates not shown); otherwise, the AND gate outputs are forced LOW. Thus, if valid[N-1] is HIGH, the output of each of the T AND gates indicates whether the corresponding tag bit in the N-1$^{th}$ entry is HIGH. Bus 32, and AND gates 38 and 40, along with XOR gate 26 perform the same function with respect to the tab bits of the 0$^{th}$ FIFO entry.

A set of T OR gates, each with N inputs, receives the signals from the N sets of AND gates. The i$^{th}$ OR gate receives the output from the i$^{th}$ gate of each of the N sets of AND gates. For example, OR gate 42 receives the state of tag bit $t_{n-1,t-1}$ from AND gate 34, and the state of tag bit $t_{0,T-1}$ from AND gate 38. (OR gate 42 also receives the state of the T-1$^{th}$ tag bit in the other N-2 entries from other AND gates, which have been omitted from FIG. 2 for simplicity.) Similarly, OR gate 44 receives the state of tag bit $t_{n-1,0}$ from AND gate 36 and the state of tag bit $t_{0,0}$ from AND gate 40. (For simplicity, the other T-2 OR gates are not shown.) In this scheme, the i$^{th}$ OR gate is associated with the i$^{th}$ tag bit in all of the entries. If the i$^{th}$ flag bit is HIGH in any valid entry, the output of the i$^{th}$ OR gate will be HIGH. Note that invalid entries are disregarded. If the i$^{th}$ entry is not valid, valid[i] will be driven LOW by the i$^{th}$ XOR gate, forcing all T AND gates coupled to tag_bus[i] LOW.

The output of each of the T OR gates is coupled to a pair of flip-flops, which synchronize the tag bit logic levels with clkb. For example, the output of the output of the T-1$^{th}$ OR gate 42 is synchronized by the T-1$^{th}$ flip-flop pair 46, while that of the 0$^{th}$ OR gate 44 is synchronized by the 0$^{th}$ flip-flop pair 48. (For simplicity, the other T-2 flip-flop pairs are not shown.) From the foregoing description of this circuitry, it will be apparent that the output of the i$^{th}$ flip-flop pair is HIGH only if the i$^{th}$ tag bit is HIGH in any of the N FIFO entries. The following equations, in pseudo hardware definition language (HDL), define the logic operations performed by the circuitry of the embodiment shown in FIG. 2:

tag_valid[T-1]=synch'ed(OR(valid[N-1:0] bitwise AND'ed with $\{t_{n-1,t-1}, t_{n-2,t-1}, \ldots, t_{0,5-1}\}$))

tag_valid[T-2]=synch'ed(OR(valid[N-1:0] bitwise AND'ed with $\{t_{n-1,T-2}, t_{m-2,T-2}, \ldots, t_{0,T-2}\}$))

tag_valid[0]=synch'ed(OR(valid[N-1:0] bitwise AND'ed with $\{t_{N-1,0}, t_{N-2,0}, \ldots, t_{0,0}\}$))

Advantageously, the system and method described herein allow the data receiving circuitry to determine whether specific tag bits are set in any valid entries without actually having to read the entry from the FIFO. As discussed earlier, the tag bits may convey important parameters, such as the source or intended destination of the data, or the nature of the transfer (e.g., read vs. write). Such information can expedite the data transfer by simplifying the requirements of the receiving circuitry.

Advantageously, the system and method described herein for detection of active tag bits in valid data may be implemented using a simple combination of common logic elements. In the embodiment described above, the portion of the circuitry that detects the active tag bits among the valid FIFO entries is comprised of combinatorial logic, and is therefore suitable for very high-speed operation, as compared to a clocked circuit. This approach to verification of valid FIFO entries also avoids the potential mestastability that might arise with more complex logic. And, because of its simplicity, an actual IC implementation of this design is relatively straightforward, and should occupy a small area on a silicon substrate when incorporated into an integrated circuit (IC). These features recommend its use in a variety of data communicated applications utilizing FIFO buffering of tagged data.

It is will be appreciated by those skilled in the art having the benefit of this disclosure that this invention is believed to present a system and method for built-in self-test and self-repair of a semiconductor memory. Further modifications and alternative embodiments of various aspects of the invention will be apparent to those skilled in the art in view of this description. Such details as the number of FIFO entries, or the number of gates, configuration of the logic, etc., as described herein, are exemplary of a particular embodiment. It is intended that the following claims be interpreted to embrace all such modifications and changes and, accordingly, the specification and drawings are to be regarded in an illustrative rather than a restrictive sense.

What is claimed is:

1. A system for indicating status of a storage device, comprising:

N storage locations, each location having T tag bits;

A N-bit read register and a N-bit write register, each of which are in communication with the respective corresponding N storage locations; and an exclusive-OR (XOR) logic gate associated with each of the N storage locations, such that the i$^{th}$ logic gate compares the i$^{th}$ bit in the write register with the i$^{th}$ bit in the read register to determine which of the N storage locations have been written to in lieu of being read from, and the status of such N storage locations dependent on whether the respective T tag bits are active.

2. The system as recited in claim 1, further comprising first and second clocks, such that data are written to the N storage locations synchronously with the first clock, and read from the N storage locations synchronously with the second clock.

3. The system as recited in claim 2, wherein valid storage locations comprise those that have been written to, but not read.

4. The system as recited in claim 3, further comprising combinatorial logic configured to transmit the logic level of each of the T tag bits in each valid storage location.

5. The system as recited in claim 4, wherein the combinatorial logic comprises a set of T AND gates for each of the N storage locations, and such that the i$^{th}$ gate in the set associated with the j$^{th}$ storage location ANDs the i$^{th}$ tag bit in the j$^{th}$ storage location with the output of the j$^{th}$ XOR gate.

6. The system as recited in claim 5, further comprising T combinatorial gates, wherein the i$^{th}$ gate ORs together the output of the i$^{th}$ AND gate in each of the N sets of T AND gates.

7. The system as recited in claim 6, further comprising circuitry of synchronizing the ORed tag bit logic levels with the second clock.

8. The system for indicating the status of a first-in first-out (FIFO) data buffer, wherein the FIFO comprises:

N storage locations, each location adapted to receive D data bits and T tag bits;

first and second clocks, such that data are written to the FIFO locations synchronously with the first clock and read from the FIFO synchronously with the second clock;

a N-bit read register and a N-bit write register, wherein the write register records with FIFO locations have been written to, and the read register records which locations have been read; and wherein the system detects the status of tag bits in any FIFO location to which data has been written to in lieu of being read from.

9. The system as recited in claim 8, further comprising combinatorial logic that compares the respective contents of the read and write registers to determine which FIFO locations have been written to but not read.

10. The system as recited in claim 9, wherein valid locations comprise those that have been written to, but not read.

11. The system as recited in claim 10, further comprising combinatorial logic configured to transmit the logic level of the T tag bits in each FIFO location that is valid, and to ignore the logic level of the tag bits in each FIFO location that is not valid.

12. The system as recited in claim 11, further comprising combinatorial logic configured to generate T outputs, such that the $i^{th}$ output represents the logical OR of the $i^{th}$ tag bit from each of the valid FIFO locations.

13. A method for indicating status of a storage device, wherein the storage device comprises:

N storage locations, each location having T tag bits; and first and second clocks, such that data are written to the storage locations synchronously with the first clock and data are read from the storage locations synchronously with the second clock;

and wherein the method comprises:

detecting valid storage locations to which data have been written, but not read by:

associating with each storage location a flag in a first register and a flag in a second register;

toggling the associated flag in the first register when data are written to a given storage location;

toggling the associated flag in the second register when data are read from a given storage location; and comparing the state of the associated flag in the first and second registers to determine whether a particular storage location is valid;

detecting active tag bits within the valid storage locations; and generating a logic signal for each of the T tag bits, such that the $i^{th}$ logic signal is active if the $i^{th}$ tag bit is active in any of the valid storage locations.

14. The method as recited in claim 13, wherein detecting active tag bits within the valid storage locations comprises, for each storage location:

comparing the associated first and second register flags to determine whether the storage location is valid; and ANDing the result of the flag comparison with the logic state of each tag bit in the storage location.

15. The method as recited in claim 13, wherein generating a logic signal for the $i^{th}$ tag bit comprises ORing the results of the active tag detection for the $i^{th}$ tag bit from all of the storage locations.

16. The method as recited in claim 13, further comprising synchronizing the logic signal generated for each tag bit to the second clock.

* * * * *